(12) United States Patent
Foster et al.

(10) Patent No.: US 10,882,493 B2
(45) Date of Patent: Jan. 5, 2021

(54) SYSTEM AND METHOD FOR VEHICLE AUTHORIZATION

(71) Applicant: Apple Inc., Cupertino, CA (US)

(72) Inventors: James H. Foster, Oxford (GB); Duncan Kerr, San Francisco, CA (US)

( * ) Notice: Subject to any disclaimer, the term of this patent is extended or adjusted under 35 U.S.C. 154(b) by 0 days.

(21) Appl. No.: 16/075,442

(22) PCT Filed: Feb. 3, 2017

(86) PCT No.: PCT/US2017/016505
§ 371 (c)(1),
(2) Date: Aug. 3, 2018

(87) PCT Pub. No.: WO2017/136725
PCT Pub. Date: Aug. 10, 2017

(65) Prior Publication Data
US 2019/0039570 A1    Feb. 7, 2019

Related U.S. Application Data

(60) Provisional application No. 62/291,304, filed on Feb. 4, 2016.

(51) Int. Cl.
*B60R 25/25* (2013.01)
*G07C 9/00* (2020.01)
(Continued)

(52) U.S. Cl.
CPC ............ *B60R 25/25* (2013.01); *B60R 25/252* (2013.01); *G06Q 20/327* (2013.01);
(Continued)

(58) Field of Classification Search
CPC .............. B60R 25/25; G06Q 20/40145; G07C 9/00309; G07C 2209/63
(Continued)

(56) References Cited

U.S. PATENT DOCUMENTS 6,144,293 A    11/2000  Plaschko et al.
6,271,745 B1   8/2001   Anzai et al.
(Continued)

FOREIGN PATENT DOCUMENTS

CN    202679415    1/2013
DE    10341286     4/2005
(Continued)

OTHER PUBLICATIONS

"Summon Your Tesla from Your Phone," The Tesla Motors Team, Jan. 10, 2016, 2 pages.
(Continued)

*Primary Examiner* — Vernal U Brown
(74) *Attorney, Agent, or Firm* — Polsinelli PC

(57) ABSTRACT

A system provides a personalized and secure user experience to access a secured asset, such as a vehicle. A first communication is transmitted, and a second communication is received in response to the first communication. An approach vector is determined based on the first communication and the second communication. The approach vector is compared with a known approach vector, a request for authentication is transmitted based on the comparison. A response to the request for authentication is received, and access to an asset is granted based on the approach vector and the response to the request for authentication.

21 Claims, 7 Drawing Sheets

(51) Int. Cl.
*G06Q 20/32* (2012.01)
*G06Q 20/40* (2012.01)

(52) U.S. Cl.
CPC ... *G06Q 20/3224* (2013.01); *G06Q 20/40145* (2013.01); *G07C 9/00309* (2013.01); *G07C 9/00563* (2013.01); *G07C 2009/00793* (2013.01); *G07C 2209/63* (2013.01)

(58) Field of Classification Search
USPC .......................................................... 340/5.5
See application file for complete search history.

(56) References Cited

U.S. PATENT DOCUMENTS

| | | | |
|---|---|---|---|
| 6,505,780 B1 | 1/2003 | Yassin et al. | |
| 6,992,562 B2 | 1/2006 | Fuks et al. | |
| 7,146,129 B2 | 12/2006 | Bostrom | |
| 7,672,666 B2 | 3/2010 | Hasan | |
| 7,698,078 B2 | 4/2010 | Kelty et al. | |
| 7,705,710 B2* | 4/2010 | Hermann | B60R 25/24 340/426.11 |
| 7,821,383 B2 | 10/2010 | Sultan et al. | |
| 7,928,829 B2 | 4/2011 | Hermann | |
| 8,299,895 B2 | 10/2012 | Harris | |
| 8,634,822 B2 | 1/2014 | Silver et al. | |
| 8,736,438 B1 | 5/2014 | Vasquez et al. | |
| 8,937,528 B2 | 1/2015 | Protopapas | |
| 8,947,202 B2 | 2/2015 | Tucker et al. | |
| 9,351,102 B2 | 5/2016 | Tucker et al. | |
| 10,202,100 B1 | 2/2019 | Tucker et al. | |
| 10,336,294 B2* | 7/2019 | Grossmann | B60R 25/01 |
| 2002/0118579 A1* | 8/2002 | Lucy | B60N 2/0248 365/200 |
| 2003/0204290 A1 | 10/2003 | Sadler et al. | |
| 2003/0231550 A1 | 12/2003 | Macfarlane | |
| 2006/0267407 A1* | 11/2006 | Nagaoka | B60R 25/24 307/10.1 |
| 2010/0087987 A1 | 4/2010 | Huang et al. | |
| 2010/0091995 A1 | 4/2010 | Chen et al. | |
| 2010/0191392 A1* | 7/2010 | Juzswik | B60R 25/245 701/2 |
| 2010/0211770 A1 | 8/2010 | Alrabady et al. | |
| 2011/0119734 A1 | 5/2011 | Crawford | |
| 2011/0264304 A1 | 10/2011 | Burzio | |
| 2012/0075059 A1 | 3/2012 | Fyke et al. | |
| 2013/0030882 A1 | 1/2013 | Davis, III et al. | |
| 2013/0104203 A1 | 4/2013 | Davis et al. | |
| 2013/0143594 A1 | 6/2013 | Ghabra et al. | |
| 2013/0204455 A1 | 8/2013 | Chia et al. | |
| 2013/0332007 A1* | 12/2013 | Louboutin | H04W 4/021 701/2 |
| 2014/0070917 A1 | 3/2014 | Protopapas | |
| 2014/0089143 A1 | 3/2014 | Dione | |
| 2015/0032621 A1* | 1/2015 | Kar | G06Q 20/4016 705/44 |
| 2015/0045013 A1 | 2/2015 | Simmons | |
| 2015/0048927 A1 | 2/2015 | Simmons | |
| 2015/0199685 A1* | 7/2015 | Betancourt | G06Q 20/40 705/44 |
| 2015/0210287 A1 | 7/2015 | Penilla et al. | |
| 2015/0241241 A1* | 8/2015 | Cudak | B62D 15/027 701/408 |
| 2015/0379793 A1* | 12/2015 | Murakami | B60R 25/24 340/5.61 |
| 2016/0209489 A1* | 7/2016 | Schrabler | G01S 3/48 |
| 2017/0151918 A1 | 6/2017 | Boesen | |

FOREIGN PATENT DOCUMENTS

| | | |
|---|---|---|
| EP | 2629269 | 8/2013 |
| WO | WO 2014/172316 | 10/2014 |

OTHER PUBLICATIONS

SIMWORX Pty Ltd., V8 Supercar & CT Race Car Simulators, originally retrieved May 26, 2015 <http://www.simworx.com.au/full-size-race-car-simulators>.

Lai, Richared, ENGADGET, Toyota Fun—Vii Concept Car Envisions Instantly Customizable Interior and Exterior, Dec. 1, 2011 <https://www.engadget.com/2011/12/01/toyota-fun-vii-concept-car-envisions-instantly-customizable-inte/>.

Wikipedia, Smart Key, originally retrieved May 26, 2015, Page Last Modified Sep. 11, 2016 <https://en.wikipedia.org/wiki/Smart_key>.

AmpedRealtor, TESLA, Model S Software Update 6.2—Range Assurance / LTE/ Valet Mode / Blind Spot and More!, Mar. 19, 2015 <https://forums.tesla.com/forum/forums/model-s-software-update-62-range-assurance-lte-valet-mode-blind-spot-and-more>.

"Biometric driver identification," Volkswagen, http://www.volkswagenag.com/content/vwcorp/content/en/innovation/communication_and_networking/Biometric.html, accessed Jun. 10, 2015.

BMW Technology Guide, "Drivers' Profiles," http://www.bmw.com/com/en/insights/technology/technology_guide/articles/driver_profile.html?source=categories&article=driver_profile, accessed Jun. 10, 2015.

Sethi, Kritika, "EyeLock Myris: Technology Through Which Human Eyes Could Start a Car," Feb. 6, 2015, http://auto.ndtv.com/news/eyelock-myris-technology-through-which-human-eyes-could-start-a-car-737454, accessed Jun. 10, 2015.

"SMS warms up your car," http://textually.org/textually/archives/2008/02/019130.htm, Feb. 19, 2008, 1 page.

U.S. Appl. No. 15/271,696, filed Sep. 21, 2016.

* cited by examiner

SYSTEM AND METHOD FOR VEHICLE AUTHORIZATION

CROSS-REFERENCE TO RELATED APPLICATION

This application is related to and claims priority under 35 U.S.C. § 119(e) to U.S. Patent Application No. 62/291,304, filed Feb. 4, 2016, entitled "SYSTEM AND METHOD FOR VEHICLE AUTHORIZATION," the entire contents of which are incorporated herein by reference.

FIELD

The described embodiments relate generally to authorization. More particularly, the embodiments relate to granting access to a secured asset.

BACKGROUND

Vehicles may be accessed and operated using a key or key fob. Typically, the key fob may provide a remote keyless entry system that provides access to the vehicle by unlocking the doors and additional functionality such as starting the engine. However, most conventional key fobs or keyless entry systems are single factor security systems that offer only a low level of security. Moreover, some conventional remote keyless entry systems are vulnerable to man-in-the-middle attacks and other security issues. For example, the vehicle is unable to identify the person carrying the key or key fob, so anyone with the key fob can operate the vehicle. Additionally, a traditional key or key fob is often large and inconvenient to carry, and easily misplaced, and thus can be stolen. Certain vehicles may provide a valet key that limits access to a storage area of the vehicle, e.g., a glove box or trunk, but otherwise allows full control of the vehicle. In short, a vehicle with a key or a key fob provides rudimentary security and would benefit from many improvements.

SUMMARY

A system includes a secured asset such as a vehicle with a computing device and optional computing devices that communicate with the vehicle. Briefly described, and according to one embodiment, aspects of the present disclosure generally relate to systems and methods for granting access to a secured asset using one of an approach vector and a response to a request for biometric authentication. The secured asset provides multiple levels of security based on a chain of trust. The chain of trust may be related to the approach vector and the response to the request for biometric authentication.

According to one embodiment, a system includes a processor to transmit a first communication, receive a second communication in response to the first communication, determine an approach vector based on the first communication and the second communication, compare the approach vector with a known approach vector and transmit a request for authentication based on the comparison, receive a response to the request for authentication, and grant access to an asset based on the approach vector and the response to the request for authentication.

According to a further embodiment, a method includes transmitting, by a processor, a first communication, receiving, by the processor, a second communication in response to the first communication, determining, by the processor, an approach vector based on the first communication and the second communication, comparing, by the processor, the approach vector with a known approach vector and transmitting a request for authentication based on the comparison, receiving, by the processor, a response to the request for authentication, and granting, by the processor, access to an asset based on the approach vector and the response to the request for authentication.

According to another embodiment, a non-transitory computer-readable medium includes instructions stored thereon that, when executed by a processor, cause the processor to perform operations including transmitting a first communication, receiving a second communication in response to the first communication, determining an approach vector based on the first communication and the second communication, comparing the approach vector with a known approach vector and transmitting a request for authentication based on the comparison, receiving a response to the request for authentication, and granting access to an asset based on the approach vector and the response to the request for authentication.

According to an additional embodiment, a system includes a processor to receive a first communication, transmit a second communication in response to the first communication, receive a notification from the vehicle, the notification comprising a request for authentication based on a comparison between an approach vector based on the first communication and the second communication and a known approach vector, transmit a response to the request for authentication, and receive access to an asset based on the approach vector and the response to the request for authentication.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
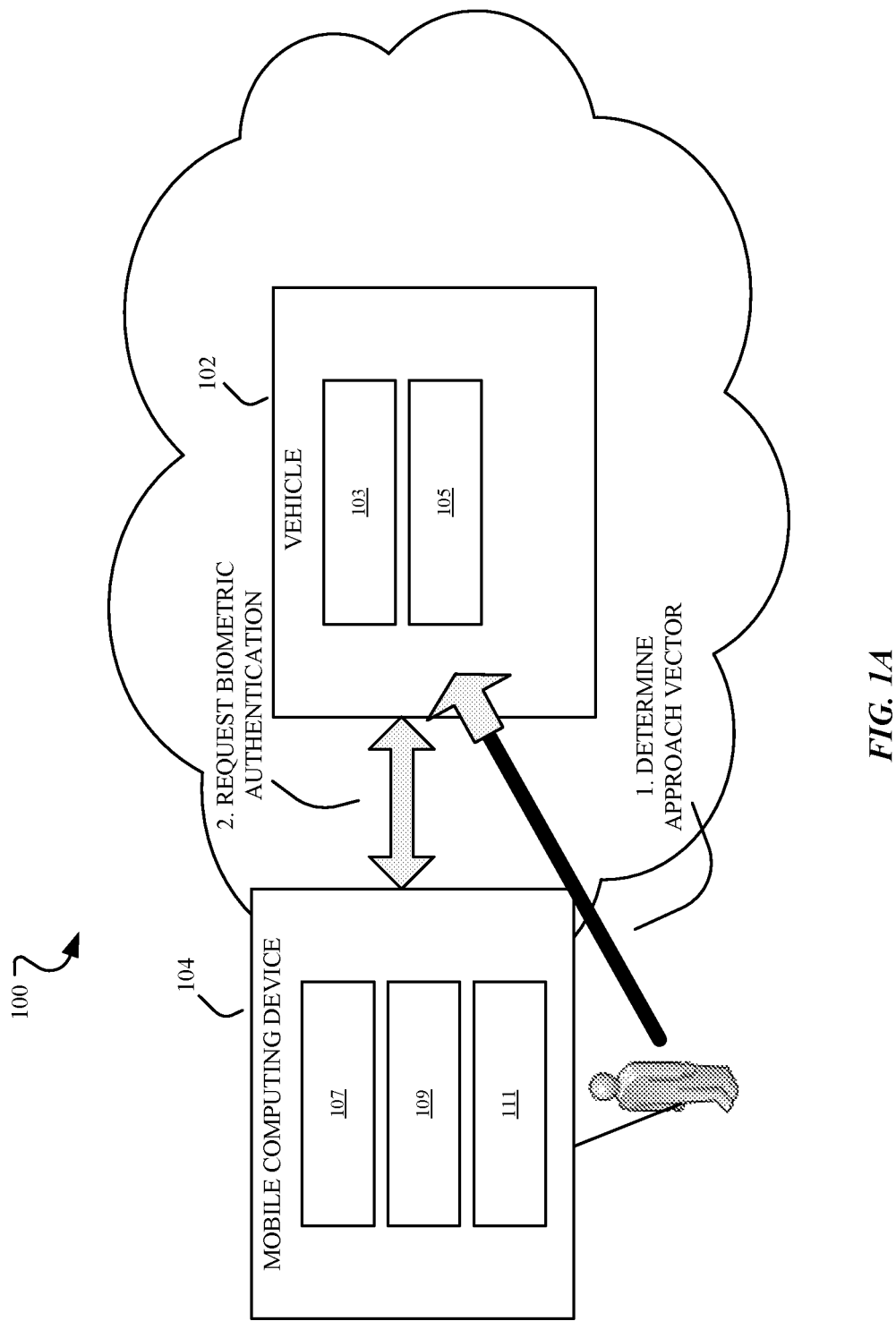
FIG. 1A illustrates a block diagram of a system according to an example embodiment.

According to an example embodiment, a vehicle and/or a mobile device provides a personalized and secure user experience that is akin to a chauffeured vehicle experience. The system may automatically unlock a door, automatically open the door, personalize vehicle interior settings, and provide extensive security for known occupants of the vehicle. Unlike conventional systems, the present disclosure describes a system with redundancies, confirmations, and personalization features to access and use the vehicle, among other things.

Many people carry mobile computing devices on their person including cellular telephones (e.g., smart phones), wearable devices, laptop computers, and other devices. These mobile computing devices include wireless connectivity and may communicate with other computing devices including a computing device associated with an asset such as a vehicle. In one embodiment, the mobile computing device and the vehicle or a system associated with the vehicle, may communicate using ultra-wideband hardware devices. The vehicle may send a first communication, or first signal, to the mobile computing device. The first signal may be an RF signal. The mobile computing device may receive the first communication and send a second communication, or second signal, to the vehicle. The second signal may be an RF signal. If a person is carrying a mobile computing device and comes within a particular proximity of the vehicle while traveling toward the vehicle (or system) at a particular angle (or a range of angles) relative to the vehicle, the vehicle may unlock and allow access to the vehicle. While discussed in the context of a vehicle, the system may also be useful for building access, storage access, or any other access to a secured space. The vehicle may accomplish these functions when the vehicle is stationary and parked and the mobile computing device approaches the vehicle and/or when the vehicle is moving and the mobile computing device approaches the vehicle.

As an example, the vehicle may be parked and the mobile computing device may be held by a person approaching the vehicle. As another example, the vehicle may be moving toward a passenger carrying the mobile computing device while the passenger is also moving toward the vehicle or while the passenger is stationary. In certain instances, the vehicle may autonomously travel to a location associated with the mobile computing device based on a communication received from the mobile computing device. The vehicle may automatically stop at the location associated with the mobile computing device and grant an occupant carrying the mobile computing device access to the vehicle, and/or provide various settings customized for the user.

In an embodiment, amongst other functions the vehicle and/or the mobile computing device may obtain biometric attributes of a person or occupant, and compare those biometric attributes with stored biometric attributes, using sensors and/or cameras or other imaging devices. The biometric attributes may be stored in memory of the mobile computing device and/or memory of the vehicle. The biometric attributes may be obtained and authenticated when the occupant approaches the vehicle. For example, the vehicle may determine that the known mobile computing device is within a particular proximity of the vehicle and at a particular angle based on an approach vector. Based on the approach vector, the vehicle may unlock and allow access, and/or when a person has authenticated biometric attributes, such as after having been prompted by an application on the mobile computing device, the vehicle may unlock and allow access to the vehicle. The vehicle may unlock and allow access when the mobile computing device is within a particular distance/angle of the vehicle. In addition, the vehicle may illuminate lights when the mobile computing device is within the particular distance/angle of the vehicle. In other cases, the vehicle may provide other welcome functions when the mobile computing device is within the particular distance/angle of the vehicle. As an example, the vehicle and/or the mobile computing device may provide audible greeting sounds (e.g., chimes, chirps and/or horn sounds) and may greet a particular occupant by name as the particular occupant enters or approaches the vehicle. In such instances, the vehicle may also accept a request, and process voice commands. For example, a user may state "vehicle please turn on the heat" and upon recognition of the command, activate the heater.

In another embodiment, the vehicle may determine when the mobile computing device is physically located within the vehicle. In certain instances, the vehicle or another computing device may determine when the vehicle enters a particular geofence or location zone and the mobile computing device is physically located within the vehicle. When the vehicle and the mobile computing device are associated with the location zone, the vehicle and/or the mobile computing device may be used to make purchases. The vehicle and/or the mobile computing device may be parked within a location zone that is associated with a coffee shop and a user may purchase a coffee. The vehicle and/or the mobile computing device may be parked within a location zone that is associated with a fueling station and a user may purchase fuel or electricity, among other things. In one example, the vehicle may determine a location of the vehicle, determine that the location of the vehicle is within the location zone, determine that the mobile computing device is within the vehicle, transmit a request for biometric authentication for payment to the mobile computing device, and receive a response to the request for biometric authentication for payment from the mobile computing device. A particular geofence may represent a virtual perimeter associated with a defined set of real-world geographic boundaries.

In an additional embodiment, the vehicle may determine a location of the vehicle, determine that the location of the vehicle is within a particular location zone, receive a communication from a hardware device physically located within the particular zone, determine that the mobile computing device is within the vehicle, transmit a request for biometric authentication for payment to the mobile computing device, and receive a response to the request for biometric authentication for payment from the mobile computing device. The vehicle may determine a payment vector based on the communication from the hardware device physically located within the particular zone, and transmit a representation of the payment vector and the response to the request for biometric authentication for payment to a server computing device for processing a transaction associated with the payment.

In a further embodiment, the vehicle may determine that the mobile computing device is within the vehicle or a particular distance/angle from the vehicle and set vehicle personal preferences. According to an example embodiment, the vehicle personal preferences may be associated with seating position, seat heating, seat cooling, steering wheel heating/cooling, and localized climate controls. If the vehicle includes an internal display for a particular seat, the internal display may transition to playing or providing the option to play media provided by a mobile computing device associated with a particular person sitting in the particular seat. The selected or played media may be based on favorite information associated with the mobile computing device (e.g., favorite music or other audio) and/or history information associated with the mobile computing device. The vehicle may maintain wireless and/or wired connections to the mobile computing device and present controls appropriately to the particular person. The display may present appropriate media player choices and a user interface by which media and/or media player choices are selected. The display also may present appropriate contact information associated with a contact list (e.g., telephone numbers) provided by the mobile computing device. The vehicle may include speakers associated with the particular seat and/or a headphone jack or a Bluetooth® or other wireless option to connect with the mobile computing device.

The vehicle personal preferences also may be associated with navigation locations (e.g., favorite locations or most recent locations), navigation settings, energy usage settings, autonomous functionality settings, security settings, other climate control settings, other entertainment settings, other seat settings, and other settings generally.

Users can benefit from use of vehicle personal preferences and personal data provided by the mobile computing device when operating the vehicle. For example, the personal data can be used to provide the vehicle with location zones, media, contact list, navigation locations, navigation settings, energy usage settings, autonomous functionality settings, security settings, other climate control settings, other entertainment settings, seat settings, among others. Accordingly, use of such personal data enables users to influence and control delivered content, and vehicle operation, among other things.

Users can selectively block use of, or access to, personal data. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

According to exemplary embodiments, the vehicle or other computing device may use both the approach vector of the mobile computing device and biometric information to grant access, among other security factors and privilege mechanisms. The vehicle does not place a significant burden on the user and offers significant security enhancements and conveniences.

These and other embodiments are discussed below with reference to FIGS. 1A-6. However, those skilled in the art will readily appreciate that the detailed description given herein with respect to these Figures is for explanatory purposes only and should not be construed as limiting.

FIG. 1A illustrates a block diagram of a system 100 according to an example embodiment. The system 100 includes a secured asset such as a vehicle 102 having a processor 103 and wireless hardware devices 105 in communication with a mobile computing device 104 having a processor 107, sensors 109, and wireless hardware devices 111. The vehicle 102 may be a machine that transports people and/or cargo including a terrestrial motor vehicle, a watercraft, and an aircraft, among other vehicles. The vehicle 102 may include an engine or motor such as an internal combustion engine, an electric motor, or a hybrid configuration. In other embodiments, the mobile computing device 104 also may be in communication with something other than a vehicle such as a different computing device.

Alternatively, the secured asset may be a building or a section of a building, among other areas. The secured asset may be a locked computing device, a locked storage container or device, or another secured space.

The vehicle 102 and the mobile computing device 104 may communicate in various ways or combinations thereof. When in relative close proximity, the vehicle 102 and the mobile computing device 104 may use ultra-wideband (UWB), Bluetooth®, WiFi, or other such short range wireless methods. In an exemplary embodiment, the vehicle 102 and the mobile computing device 104 may communicate when they are located within a particular distance, e.g., three hundred meters of one another. They may communicate using a wireless device 105, 111 with position and distance capability, for example, a UWB hardware device.

In an exemplary embodiment, the vehicle 102 and the mobile computing device 104 include ultra-wideband functionality and communicate using ultra-wideband communications. The vehicle 102 may transmit a first communication at a first time at a first location using a first wireless hardware device 105 and/or another hardware device. The first hardware device 105 may be one of a UWB hardware device, a Bluetooth® hardware device, a WiFi hardware device, and others. In one example, the first communication is a first RF signal. In another example, the first communication may be a first packet. The first hardware device 105 may be located in, on, or near the vehicle 102. The vehicle 102 may receive a second communication at a second time after the first time in response to the first communication. The second communication may be from a second wireless hardware device 111 and/or another hardware device. The second hardware device 111 may be one of a UWB hardware device, a Bluetooth® hardware device, a WiFi hardware device, and others, and transmitted by the mobile computing device 104 at a second location. In one example, the second communication is a second RF signal. In another example, the second communication may be a second packet. Using the first communication and the second communication, the vehicle determines an approach vector for the mobile computing device 104 in relation to the vehicle. Using the first communication and the second communication, the vehicle may determine time distance of arrival (TDoA) and phase difference of arrival (PDoA). The vehicle may use a combination of signal strength and PDoA from a Bluetooth LE hardware device in a first low power pass and switch to a higher power UWB hardware device in a second pass to improve accuracy.

In another example, the first hardware device 105 may be a 60 GHz hardware device (e.g., WiGig or IEEE 802.11ad) and the second hardware device 111 may be a 60 GHz hardware device (e.g., WiGig or IEEE 802.11ad).

Either the vehicle 102 or the mobile computing device 104 can initiate the first communication, while the vehicle 102 or the mobile computing device 104 can respond to the first communication with the second communication.

The vehicle 102 or mobile computing device 104 that transmitted the first communication may record the time of transmission of the first communication and the time that it received the second communication and determine the time lapse between the recorded time of the first communication and the second communication. Based on the time lapse and the known speed of light, the vehicle 102 or the mobile computing device 104 may determine the range to the vehicle 102 or the mobile computing device 104. In certain instances, time corrections may be made to account for signal delays, e.g., the time for the receiving device to receive the first communication and then transmit its own second communication in response, the time that the first device calculates the range, and so on. A predetermined delay may be subtracted from the calculated time lapse. In one example, a range calculation may be based on the following equation: $d=c/2*(\text{time lapse}-\text{time offset})$, where d is equal to a range or distance of the devices, c is equal to the speed of light, the time lapse is equal to the time of transmission of an RF signal at a first device and the time of receipt of a return RF signal from a second device, and the time offset is equal to a time accounting for system delays. Another example range calculation may be equal to $d=c*(\text{time lapse}-\text{time offset})$. This equation may be used when the first device emits a signal and the second device receives the signal, in a one-way trip implementation. The range calculations may be affected by orientation of the devices. As an example, the vehicle 102 and/or the mobile computing device 104 may be oriented in a particular way when the range is being calculated. The vehicle 102 and the mobile computing device 104 may use orientation data to calculate the range.

The approach vector may indicate that a person carrying the mobile computing device 104 intends to obtain access to the vehicle 102 and provide contextual awareness to the user experience associated with the vehicle. The approach vector may indicate a velocity of the mobile computing device 104 and may be used to determine a rate at which the mobile computing device 104 is changing its position. The velocity may indicate a speed and a direction of the mobile computing device 104. The person intending to obtain access to the vehicle may typically approach the vehicle 102, when intending to enter, within a limited range of approach angles and speeds. As an example, the person carrying the mobile computing device 104 may be taking a unique approach path to the vehicle 102 that is unknown or unexpected to the vehicle. If there is something about the approach vector that is unknown, unexpected, or unique, then the vehicle 102 may request additional secondary authentication from the mobile computing device 104. Over time, using machine learning, the vehicle 102 may determine known, expected, and usual approach vectors for the person carrying the mobile computing device 104 and use the known, expected, and usual approach vectors to grant access to the vehicle 102.

Additionally, in certain locations and/or situations, even if the approach vector is known or expected, the vehicle 102 may request additional secondary authentication. As an example, additional secondary authentication may not be requested when the vehicle 102 is located at a favorite location such as home or work. However, if the vehicle 102 is located in an unknown parking garage in an unfamiliar city, then the vehicle may request additional secondary authentication even if the approach vector is known. The vehicle 102 provides multiple levels of security based on a chain of trust. The chain of trust may be related to the approach vector, the response to the request for biometric authentication sent from the mobile computing device 104, the location of the vehicle 102, and other factors. The user also may set various levels of security.

In one embodiment, the first wireless hardware device 105 and the second wireless hardware device 111 may communicate with one another to allow the vehicle 102 to determine time of flight (TOF) or time of arrival (TOA) and angle of arrival (AOA) for the mobile computing device 104. The amount of time it takes for an electromagnetic wave to propagate over the air from the first wireless hardware device to the second wireless hardware device may be referred to as time of flight. Time of flight is proportional to distance. Thus, time of flight information and/or angle of arrival may be gathered to estimate relative locations of the first wireless hardware device and the second wireless hardware device. Additionally, the time of flight information may be gathered in combination with other positioning metrics such as angle of arrival. Other positioning metrics may include time difference of arrival (TDOA), received signal strength indication (RSSI), and near field electromagnetic ranging (NFER).

The vehicle 102 may determine the time of flight and angle of arrival using phase difference of arrival and time. Using the first wireless hardware device 105, the vehicle 102 may determine in realtime the angle and distance of the mobile computing device 104 and determine when the mobile computing device 104 arrives at the vehicle 102. The wireless hardware device 105 may be a single chip UWB IEEE802.15.4-2011 compliant wireless transceiver that allows the determination of a location of an object to a precision of ten centimeters and an angle of ten minutes indoors and/or outdoors. The UWB hardware device may be immune to multipath fading and allow for reliable communications in a variety of environments. This can provide advantages over Wi-Fi, Bluetooth, and others, although embodiments of the disclosure can use various different wireless technologies.

At longer ranges, the vehicle 102 and the mobile computing device 104 may communicate using a cellular communications network or another communications network. Accordingly, communication may involve the Internet, an intranet, a cellular communications network, a WiFi network, a packet network, a short-range wireless network, or another wired and/or wireless communication network or a combination of any of the foregoing. As an example, the vehicle 102 and the mobile computing device 104 communicates data in packets, messages, or other communications using a common protocol, e.g., Hypertext Transfer Protocol (HTTP) and/or Hypertext Transfer Protocol Secure (HTTPS). The vehicle 102 and/or the mobile computing device 104 may communicate with other optional server computing devices associated with the system 100.

The vehicle 102 and/or the mobile computing device 104 may also optionally include Bluetooth® Low Energy (BLE, Bluetooth® LE, Bluetooth® Smart) functionality based on the Bluetooth 4.0 specification or another specification. In addition, the vehicle 102 may include a beacon. According to an example embodiment, the vehicle 102 and the mobile computing device 104 are paired and communicate wirelessly using a short range wireless network, e.g., Bluetooth® (IEEE Standard 802.15). The short range wireless network may be a wireless personal area network (WPAN).

In another example, the vehicle 102 may optionally create a personal area network and/or a mesh network for communicating with the mobile computing device 104. Additionally, the vehicle 102 and the client computing device 104 may communicate using Zigbee®, Wi-Fi, near field magnetic inductance, sonic (sound) waves, ultrasound waves, and/or infrared (light) waves, among others. While ultrasound is a line of sight technology and has a more limited range, UWB uses radiofrequency pulses and has high gain. This allows UWB hardware to penetrate through walls and obstacles and provide highly precise ranging. Additionally, UWB uses very short pulses for radio transmission providing low energy consumption and enables the use of battery-operated computing devices.

Figure 1B:
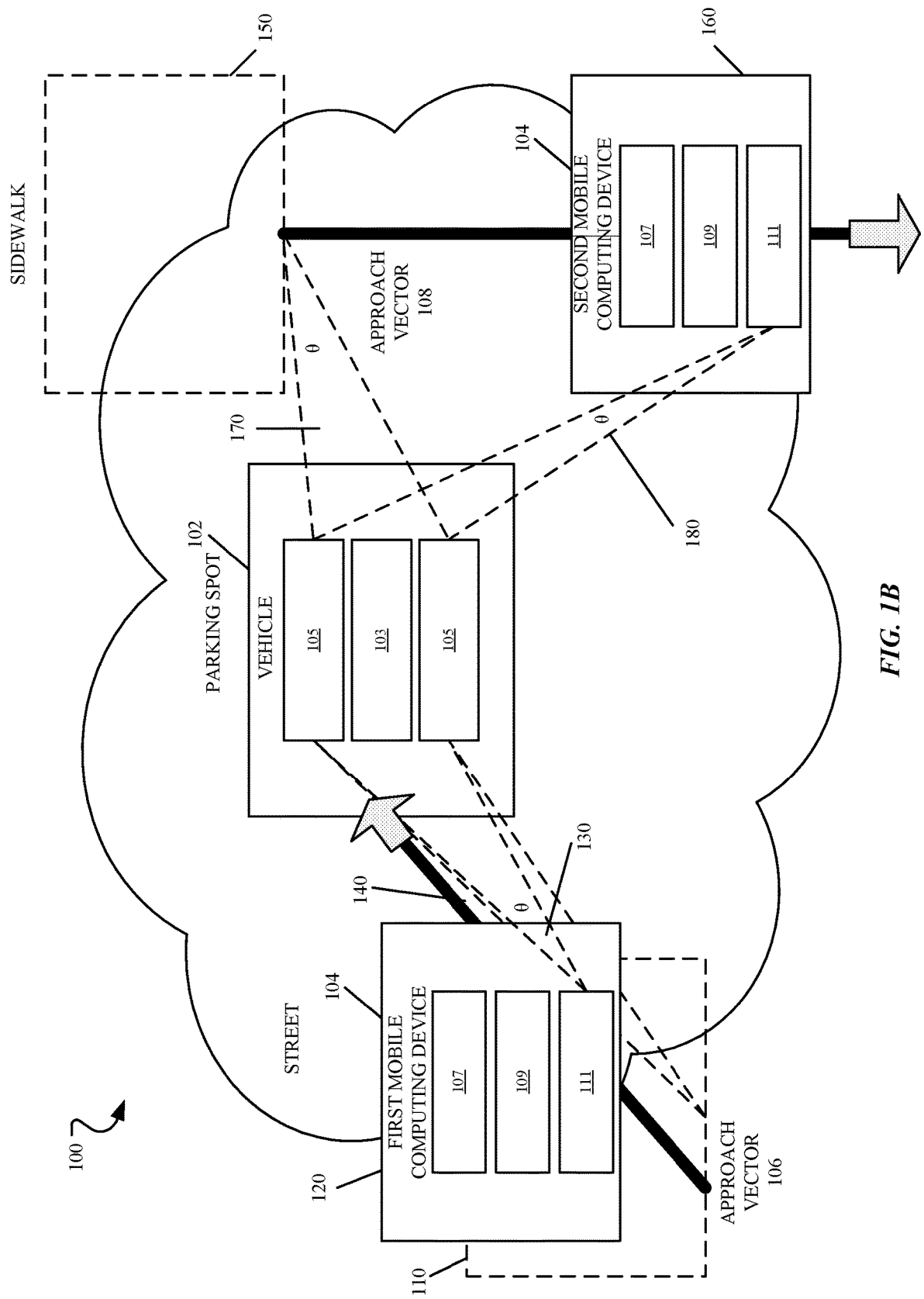
FIG. 1B illustrates another block diagram of the system according to an example embodiment.

FIG. 1B illustrates another block diagram of the system 100 according to an example embodiment. As shown in FIG. 1B, the vehicle 102 includes two wireless hardware devices 105 including a first wireless hardware device 105 in a front portion of the vehicle and a second wireless hardware device 105 in a rear portion of the vehicle. The first wireless hardware device 105 and the second wireless hardware device 105 may receive communications from a wireless hardware device 111 of a mobile computing device 104 at slightly different times, such that the time differences can be used to determine the relative distance and angle of the mobile computing device at any particular time. The vehicle 102 may have additional wireless hardware devices or fewer wireless hardware devices. The mobile computing device 104 may have additional wireless hardware devices. In this embodiment, the vehicle 102 measures angles of arrival of the wireless radio signals and performs triangulation in order to determine sources of the signals, e.g., the first wireless hardware device 105 in the first portion of the vehicle receives radio signals from the mobile computing device 104 and the second wireless hardware device 105 in the rear portion of the vehicle receives radio signals from the mobile computing device 104. Using triangulation, the vehicle 102 may determine the approach vector of the mobile computing device 104. Angles may be determined based on differences in the times of arrival of the signals. Using the angles, the position of the mobile computing device 104 may be determined.

As shown in FIG. 1B, the vehicle 102 is parked and stationary in a parking spot. A first mobile computing device 104 is located on a left side of FIG. 1B and is in the process of approaching the vehicle along an approach vector 106 represented with a solid thick line. At a particular point in time, the first mobile computing device is a particular distance from the vehicle and at a particular angle, θ. The first mobile computing device 104 moves from a first point 110 to a second point 120 as indicated by the dotted representation of the first mobile computing device 104. FIG. 1B also shows a change in the angle of arrival of the first mobile computing device 104 from a first angle 130 to a second angle 140 as it approaches the vehicle. A second mobile computing device 104 is located on a right side of FIG. 1B and is in the process of traveling along an approach vector 108 parallel to the vehicle and away from the vehicle. At this particular point in time, the second mobile computing device is a particular distance from the vehicle and at a particular angle, θ. The second mobile computing device 104 moves from a first point 150 to a second point 160 as indicated by the dotted representation of the second mobile computing device 104. FIG. 1B also shows a change in the angle of arrival of the second mobile computing device 104 from a first angle 170 to a second angle 180 as it travels along the approach vector parallel to the vehicle and away from the vehicle.

In one example, the first computing device 104 may have traveled across the street toward a driver side or left side of the vehicle. The second computing device 104 may be traveling along a sidewalk parallel to the parked vehicle. The wireless hardware devices 105 of the vehicle 102 continually communicate with the wireless hardware device 111 of the first mobile computing device 104 and the second mobile computing device 104. The vehicle 102 may compare the approach vector of the first mobile computing device 104 with known approach vectors and determine that this is a known approach vector using time of flight and angle of arrival. Based on the location of the vehicle 102, the vehicle may grant access to the vehicle. The vehicle 102 may unlock doors and extend welcome functions including external lighting, internal lighting, cabin configuration, cabin control, and other welcome functions. The doors may include front doors, rear doors, trunk doors, trunk doors, and storage doors. One of the front doors may be a driver door. Other doors may be passenger doors.

The vehicle 102 also may compare the approach vector of the second mobile computing device 104 with known approach vectors and determine that this is not a known approach vector using time of flight and angle of arrival. If the second mobile computing device 104 is a known computing device, then the vehicle 102 may request additional secondary authentication from the second mobile computing device 104 and send a notification to the second mobile computing device 104. If the second mobile computing device is an unknown computing device, then the vehicle may not send a notification to the second mobile computing device to request additional secondary authentication. When a mobile computing device 104 is first used to access the vehicle 102, the vehicle 102 may register the mobile computing device 104 and store an identification that represents the mobile computing device 104. In the future, when this mobile computing device 104 is used to access the vehicle 102, the mobile computing device 104 will be a known mobile computing device 104.

Figure 2:
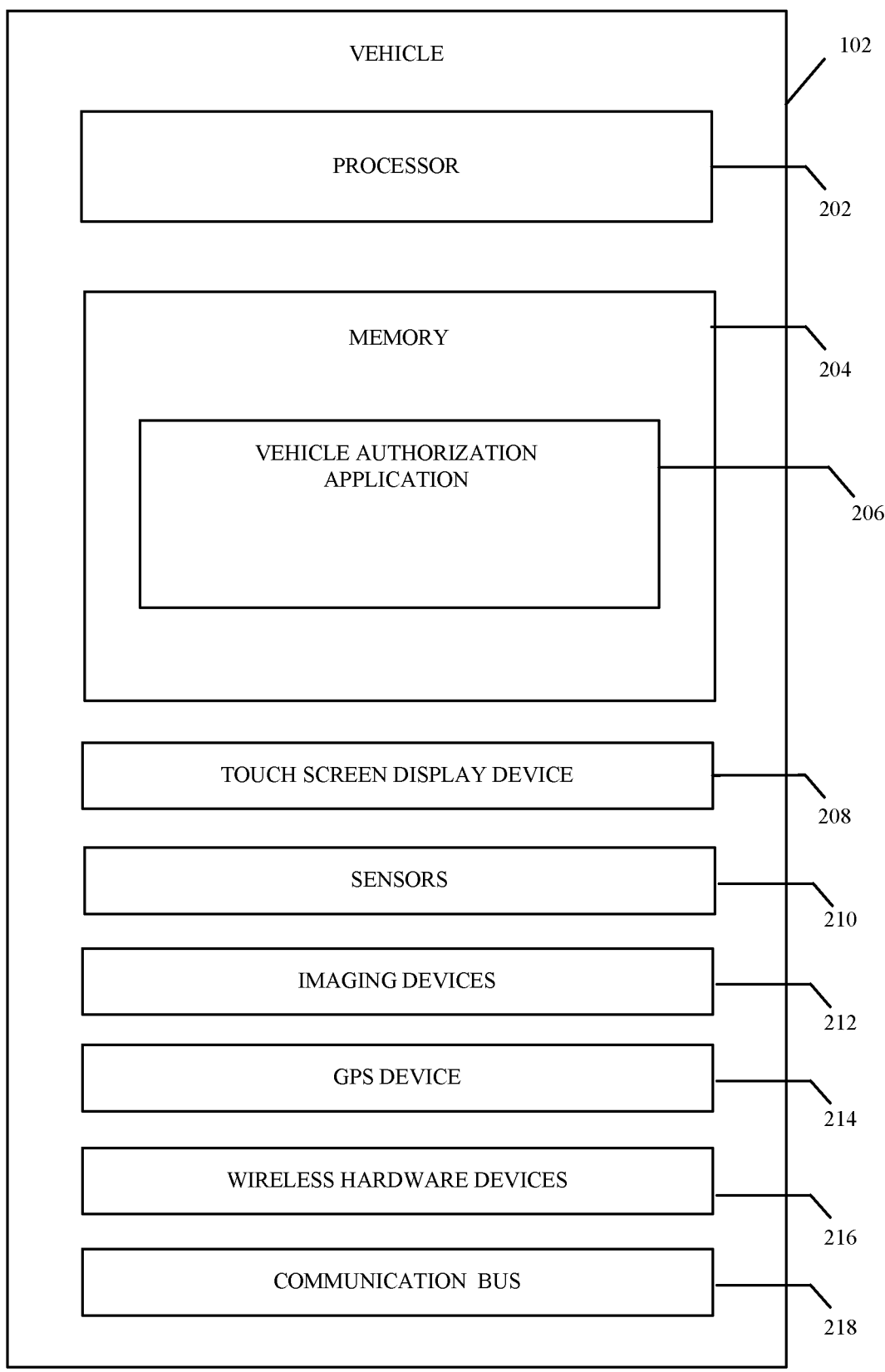
FIG. 2 illustrates a block diagram of a vehicle according to an example embodiment.

FIGS. 1A, 1B, and 2 illustrate a block diagram of the vehicle 102 according to an example embodiment. The vehicle 102 may include a computer having hardware components including a processor 202 and memory 204, such as a vehicle onboard computer or a dedicated electronic device having a processor and memory. The processor 202 processes machine/computer-readable executable instructions and data, and the memory 204 stores machine/computer-readable executable instructions and data including applications, including a vehicle authorization application 206. The processor 202 and memory 204 are hardware. The processor 202 may be a hardware processing unit. In one embodiment, the processor 202 includes a secure enclave processor (SEP). The SEP stores and protects information used for identifying known mobile computing devices, biometric information, and approach vector information, among other information. The memory 204 includes random access memory (RAM) and non-transitory memory, e.g., a non-transitory computer-readable storage medium such as flash storages or hard drives. The non-transitory memory may include any tangible computer-readable medium including, for example, magnetic and/or optical disks, flash drives, and the like.

The vehicle 102 further can include touch screen display devices 208, such as a liquid-crystal display (LCD) for receiving input and displaying output, sensors 210, cameras or imaging devices 212, a global positioning system (GPS) device 214, wireless hardware devices 216, and a communication bus 218. The vehicle 102 may include other wireless communication devices for communicating including a wireless transceiver, a cellular transceiver, a Bluetooth transceiver, and others. The wireless hardware devices 216 may be UWB hardware devices.

The touch screen display devices 208 may be located on an exterior of the vehicle and/or an interior of the vehicle for receiving input and displaying output including passwords. For example, the touch screen display devices 208 may be located on or within a window or on an exterior of the vehicle. The sensors 210 and the imaging devices 212 may be used for biometric identification and authentication. The sensors 210 may be located on the exterior of the vehicle and/or the interior of the vehicle and include fingerprint sensors, iris recognition devices, eye vein verification devices, microphones, seat pressure sensors, load or weight sensors (e.g., a strain gauge), pressure sensors, and electrocardiogram (ECG) sensors, among others. The sensors 210 may be coupled with the processor 202 for obtaining biometric information.

The imaging devices 212 may be coupled with the processor 202 for facial recognition. The imaging devices 212 include high-definition cameras and may be used to determine two-dimensional images and/or three-dimensional images including a two-dimensional image of a face or a three-dimensional image of a face, a height of a person, a body shape of a person, or a gait of a person. The imaging devices 212 may be located on an exterior of the vehicle and/or an interior of the vehicle. In one example, each seat within the vehicle may include imaging devices to capture a face of a passenger sitting in that particular seat. The touch screen display devices 208 and/or the imaging devices 212 may be used to receive gestures. The microphones may be used to receive verbal passphrases.

The global positioning system device 214 may receive GPS signals and thereby determine a current location of the vehicle 102. The wireless hardware devices 216 may include one first wireless hardware device located in a front portion of the vehicle 102 and one second wireless hardware device located in a rear portion of the vehicle 102. However, the wireless hardware devices 216 may be arranged in other ways.

Figure 3:
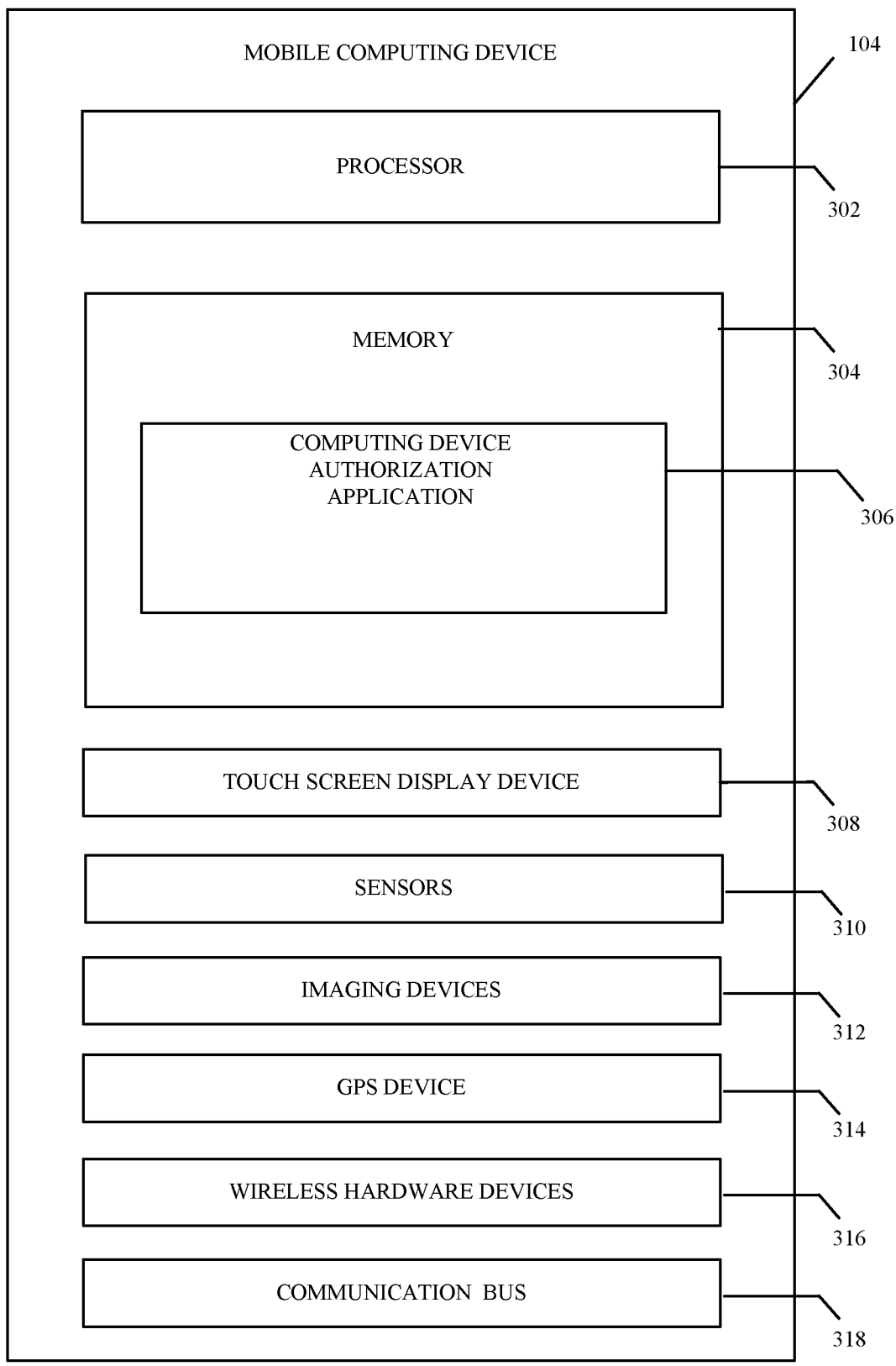
FIG. 3 illustrates a block diagram of a mobile computing device according to an example embodiment.

FIGS. 1A, 1B, and 3 illustrate a block diagram of the mobile computing device 104 according to an example embodiment. The mobile computing device 104 may be a computer having a processor 302 and memory 304, such as a laptop, desktop, tablet computer, mobile computing device (e.g., a smartphone), a wearable device (e.g., a watch), or a dedicated electronic device having a processor and memory. The processor 302 processes machine/computer-readable executable instructions and data, and the memory 304 stores machine/computer-readable executable instructions and data including applications, including a computing device authorization application 306. The processor 302 and memory 304 are hardware. The processor 302 may be a hardware processing unit. In one embodiment, the processor 302 includes a secure enclave processor (SEP). The SEP stores and protects biometric information and approach vector information, among other information. The memory 304 includes random access memory (RAM) and non-transitory memory, e.g., a non-transitory computer-readable storage medium such as flash storages or hard drives. The non-transitory memory may include any tangible computer-readable medium including, for example, magnetic and/or optical disks, flash drives, and the like.

The mobile computing device 104 further includes a touch screen display device 308 such as a liquid-crystal display (LCD) to receive input and display output, sensors 310 such as an ambient light sensor, an accelerometer, a gyroscopic sensor, microphones, a magnetometer, a barometer, and a fingerprint sensor, cameras or imaging devices 312, a GPS device 314, wireless hardware devices 316, and a communication bus 318. The mobile computing device 104 may include other wireless communication devices for communicating including a wireless transceiver, a cellular transceiver, a Bluetooth transceiver, and others. The wireless hardware devices 316 may be UWB hardware devices.

The touch screen display device 308 receives input and displays output. The sensors 310 and the imaging devices 312 may be used for biometric identification and authentication. The sensors 310 may be coupled with the processor 302 for obtaining biometric information. The imaging devices 312 may include high-definition cameras and may be used to determine two-dimensional images and/or three-dimensional images including a two-dimensional image of a face or a three-dimensional image of a face, a height of a person, a body shape of a person, or a gait of a person. The touch screen display device 308 and/or the imaging devices 312 may be used to receive gestures. The microphones may be used to receive verbal passphrases. The global positioning system device 314 may continually determine a current location of the mobile computing device 104.

The wireless hardware devices 316 communicate with the wireless hardware devices 216. In one example, the wireless hardware device 216 sends a first communication to the wireless hardware device 316 and the wireless hardware device 316 sends a second communication back to the wireless hardware device 216. The vehicle 102 uses the first communication including the location of the origin of the first communication, the second communication including the location of the origin of the second communication, and a time difference between the first communication and the second communication to determine the approach vector and compare the approach vector with known approach vectors stored with the approach vector information in memory 204, memory 304, and/or memory of the SEP in the vehicle and the mobile computing device. If the approach vector is a known approach vector, the vehicle 102 may grant access. Otherwise, the vehicle 102 may request biometric authentication information from the mobile computing device 104, and compare a response to the request for biometric authentication information with known biometric authentication information. In certain instances, even if the approach vector is a known approach vector, based on a location of the vehicle 102, the vehicle may request biometric authentication information. The location of the vehicle 102 may be associated with high crime and/or may be unknown to the vehicle 102 or the mobile computing device 104. Based on the approach vector and the response to the request for biometric authentication information, the vehicle 102 may grant access.

The computing device authorization application 306 may be a component of an application and/or service executable by the mobile computing device 104. For example, the computing device authentication application 306 may be a single unit of deployable executable code. According to one aspect, the computing device authentication application 306 may be a web application, a native application, and/or a mobile application (e.g., an app) downloaded from a digital distribution application platform that allows users to browse and download applications developed with mobile software development kits (SDKs).

As an example, the vehicle 102 may receive a communication from a known mobile computing device 104, determine, by sensors 210 and/or sensors 310, biometric information associated with a known occupant, grant access to the vehicle 102, and set vehicle personal preferences based on the communication and the biometric information. The biometric information may be a fingerprint and/or another type of biometric information.

In one example, when the mobile computing device 104 is within wireless communication range of the vehicle 102, the vehicle 102 transmits the communication to the mobile computing device 104. The mobile computing device 104 responds to the communication. Based on the approach vector of the mobile computing device 104 and biometric authentication information, the vehicle 102 may unlock one or more doors and extend welcome functions including external lighting, internal lighting, cabin configuration, and other welcome functions. As an example, the vehicle 102 may greet a particular occupant by name: "Hello James." The vehicle may unlock the doors including front doors, rear doors, and other doors such as a trunk door and provide welcome functions such as an audible chime when the mobile computing device is a particular distance from the vehicle, e.g., one meter. The particular distance may be modified and may be based on a particular location of the vehicle 102.

In another example, a person may touch a door handle or door of the vehicle 102 to provide the biometric authentication information. The door handle or the door may have a fingerprint sensor and/or other sensors for obtaining a fingerprint and/or other signals. The vehicle 102 may then compare the biometric information associated with the person with biometric attributes stored in memory 204 of the vehicle 102 and/or memory 304 the mobile computing device 104. Based on the approach vector and/or the biometric authentication information, the vehicle 102 may unlock doors and may extend welcome functions. The person may enter the vehicle 102 and sit in a driver seat or a passenger seat. At this point, the vehicle 102 may use UWB, WiFi, Bluetooth, and/or others to determine that the mobile computing device 104 is located within an interior of the vehicle.

In an additional example, the vehicle 102 may include secure storage areas, e.g., a glove compartment or a vehicle safe. The vehicle 102 may determine whether the mobile computing device 104 is located within the interior of the vehicle 102 and/or whether a person is located within the interior of the vehicle 102 and allow access to the secure storage areas. After the mobile computing device 104 and/or the person exits the vehicle 102 and a particular period of time elapses, the vehicle 102 may automatically lock doors and/or the secure storage areas.

In another embodiment, the vehicle 102 may determine when the mobile computing device 104 is physically located within the vehicle using the wireless hardware device 216 and the wireless hardware device 316. When the mobile computing device 104 is physically located in the vehicle 102, the vehicle 102 may block or ignore communications from other unknown or non-authenticated computing devices outside of the vehicle. While the mobile computing device 104 is located inside the vehicle 102 and the wireless hardware device 216 is sending communications to the wireless hardware device 316 and receiving communications in response, the vehicle may not be controlled by computing devices outside of the vehicle 102.

In certain instances, the vehicle 102 or another computing device may determine when the vehicle 102 enters a particular geofence or location zone and the mobile computing device 104 is physically located within the vehicle 102. The particular geofence may represent a virtual perimeter associated with a defined set of real-world geographic boundaries. The particular geofence may be associated with a particular merchant and may include a parking space, a parking lot, a drive-through, and/or another physical location associated with the particular merchant. The particular geofence may have a region that is based on a radius from the particular merchant and may be set by the merchant, e.g., 500 feet from the merchant. As an example, the other computing device may be associated with the particular merchant. The merchant may provide one of fuel, electricity, parking, food, media, and other services or goods. The other services or goods may include an audio tour guide, map, or app (application) for a particular venue provided by the vehicle 102 and/or the mobile computing device 104. In one example, the particular venue may be a zoo, a stadium, a music venue, a museum, or another venue.

When the vehicle 102 and the mobile computing device 104 are associated with the location zone, the vehicle 102 and/or the mobile computing device 104 may be used to make purchases at or with the merchant. In one example, the vehicle 102 may determine a location of the vehicle, determine that the location of the vehicle is within the location zone associated with the merchant, determine that the mobile computing device 104 is within the vehicle 102, transmit a request for biometric authentication for payment to the mobile computing device 104, and receive a response to the request for biometric authentication for payment from the mobile computing device 104. The response may be a representation of a fingerprint and/or an authentication of a fingerprint. The vehicle 102 and/or the mobile computing device 104 may receive a notification that requests the secondary authentication. The notification may be displayed on touch screen 208 and/or touch screen 308. A user may place a finger on a fingerprint sensor of the mobile computing device 104 and the mobile computing device 104 may authorize the user and transmit the representation of the fingerprint to the vehicle 102. In one example, if the mobile computing device 104 is paired with a watch or another wearable device and communicating using Bluetooth or another communication protocol and the watch is on a wrist of a known occupant, the mobile computing device 104 may automatically transmit a representation of the biometric information and the notification may not be displayed on the touch screen 308. In that instance, when the watch is first placed on the wrist, the mobile computing device 104 may display the notification on the touch screen 308 requesting that the user place their finger on the fingerprint sensor. As a result, when wearing the watch and the watch is in communication with the mobile computing device 104, a user may not have to place their finger on the fingerprint sensor of the mobile computing device 104.

For example, an occupant of the vehicle 102 may pre-order a coffee using the vehicle 102 and/or the mobile computing device 104 and arrive at the location zone. The merchant may be notified when the vehicle 102 arrives at the location zone. The vehicle 102 and/or the mobile computing device 104 may receive a notification that requests the secondary authentication. The merchant may send the request for biometric authentication for payment, the vehicle 102 may receive the response to the request for biometric authentication for payment from the mobile computing device, and the merchant may deliver the coffee to the occupant of the vehicle 102.

In an additional example, an occupant of the vehicle 102 may pre-order groceries or other retail goods using the vehicle 102 and/or the mobile computing device 104 and arrive at the location zone. The merchant may be notified when the vehicle 102 arrives at the location zone. The vehicle 102 and/or the mobile computing device 104 may receive a notification that requests the secondary authentication. The merchant may send the request for biometric authentication for payment, the vehicle 102 may receive the response to the request for biometric authentication for payment from the mobile computing device, and the merchant may deliver the groceries or other retail goods to the occupant of the vehicle 102.

In another example, an occupant of the vehicle 102 may arrive at a fuel/electric station using the vehicle. The station may have an associated location zone and the merchant may be notified when the vehicle 102 arrives at the location zone. The vehicle 102 may transmit a request for biometric authentication for payment to the mobile computing device 104. The vehicle 102 and/or the mobile computing device 104 may receive a notification that requests the secondary authentication. While inside the vehicle, the occupant may use the mobile computing device 104 and provide fingerprint information to a sensor 310 of the mobile computing device. The vehicle 102 receives the response to the request for biometric authentication for payment including the fingerprint information. The occupant of the vehicle pays for the fuel/electricity at the station using the vehicle 102 and/or the mobile computing device 104 without leaving the vehicle 102.

In an even further example, an occupant of the vehicle 102 may create a location zone to exchange payment or receive payment from another occupant of a different vehicle or a user of a mobile computing device 104. The occupant may create the location zone based on the location of the vehicle 102 or the mobile computing device 104. As an example, when the vehicle 102 and/or the mobile computing device 104 enter the zone, the vehicle 102 and/or the mobile computing device 104 may request secondary authentication regarding the payment and receive a response to the request and process the payment. The vehicle 102 and/or the mobile computing device 104 may receive a notification that requests the secondary authentication. The response to the request may be a representation of a fingerprint and/or an authentication of a fingerprint.

In an additional embodiment, the vehicle 102 may determine a location of the vehicle, determine that the location of the vehicle is within a particular location zone, receive a communication from a third wireless hardware device physically located within the particular zone, determine that the mobile computing device 104 is within the vehicle, transmit a request for biometric authentication for payment to the mobile computing device 104, and receive a response to the request for biometric authentication for payment from the mobile computing device. The response may be a representation of a fingerprint and/or an authentication of a fingerprint. The vehicle 102 may receive the communication from the hardware device physically located within the particular zone and may determine a payment vector. The hardware device physically located within the particular zone may use the payment vector to process and authorize the payment based on the location, distance, range, and/or angle of the vehicle 102 from the hardware device physically located within the particular zone. The payment vector may indicate a velocity of the vehicle 102 and may be used to determine a rate at which the vehicle 102 is changing its position. The velocity may indicate a speed and a direction of the vehicle 102. The vehicle 102, when approaching the hardware device physically located within the particular zone, may approach within a limited range of angles and speeds. Over time, using machine learning, the hardware device physically located within the particular zone may determine known, expected, and usual payment vectors and use the known, expected, and usual payment vectors to process and authorize payments.

As an example, the vehicle 102 may enter a drive through associated with the merchant and pull up to a window having a point of sale computing device with the hardware device. The hardware device or the vehicle 102 may transmit a representation of the payment vector and the response to the request for biometric authentication for payment to a server computing device for processing a transaction associated with the payment. The hardware device physically located in the particular zone may further include imaging devices that capture the vehicle 102 located within the particular location zone.

Figure 4:
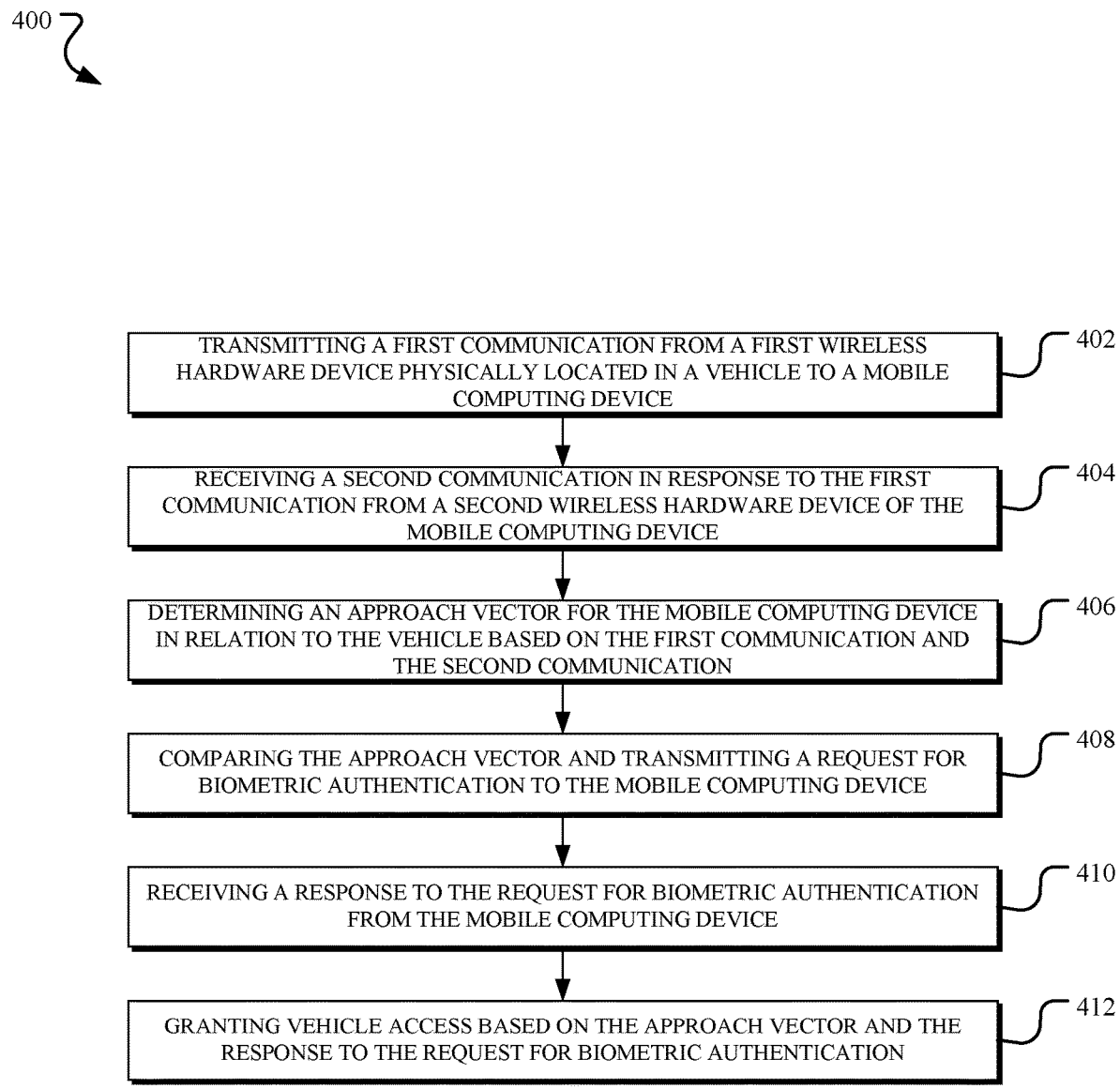
FIG. 4 illustrates a flowchart for granting access to a vehicle according to an example embodiment.

FIG. 4 illustrates a flowchart of a process 400 for granting access to the vehicle according to an example embodiment. The process 400 shown in FIG. 4 begins at operation 402. In 402, a first wireless hardware device 216 transmits a first communication. The first wireless hardware device 216 may located within, on, or near the vehicle 102. The first communication is sent to the mobile computing device 104 and may be received by the mobile computing device 104 when the mobile computing device is within a particular distance of the vehicle, e.g., three hundred meters.

In 404, the vehicle 102 receives a second communication in response to the first communication. The first hardware device 216 receives the second communication. The second communication may be sent from a second wireless hardware device 316 of the mobile computing device 104.

In 406, the vehicle 102 determines an approach vector based on the first communication and the second communication. The approach vector may be for the mobile computing device 104 in relation to the vehicle 102 and may indicate angle and distance in realtime as the mobile computing device 104 approaches the vehicle 102. The vehicle 102 and/or the mobile computing device 104 may be moving or stationary. The approach vector may be based on time of flight and angle of arrival using phase difference of arrival and time.

In 408, the vehicle compares the approach vector with known approach vectors for the vehicle 102 and transmits a request for biometric authentication if the approach vector does not appropriately match known approach vectors. In one embodiment, the vehicle also may send the request for biometric authentication if the vehicle is located in a particular location even if the approach vector is a known approach vector. The location may have a reputation for high crime and/or may be unknown to the vehicle 102 and/or the mobile computing device 104. The known approach vectors may be stored in the memory 204, the memory 304, and the memory of the SEP. The request may be sent to the mobile computing device 104. In another embodiment, the vehicle 102 may provide access and open doors based on the approach vector but may request the biometric authentication before allowing operation of the vehicle.

In 410, the vehicle 102 receives a response to the request for biometric authentication. The response may be sent from the mobile computing device 104 or the response may be provided directly to the vehicle 102. The response may be a representation of fingerprint information and may be obtained from a sensor 310 of the mobile computing device 104. A user may place their finger on a fingerprint sensor of the mobile computing device 104 and the mobile computing device 104 may capture a representation of the fingerprint. In another embodiment, the fingerprint information may be obtained from a sensor 210 of the vehicle 102. The response may include other biometric information. As an example, the biometric information may be associated with a voice of the user captured by the sensors 210 and/or sensors 310 or an image of the user captured by the imaging devices 212 and/or imaging devices 312 separate from or in addition to the representation of the fingerprint. The vehicle 102 may perform voice recognition and/or confirm that an audible password is correct.

In 412, the vehicle 102 grants access based on the approach vector and the response to the request for biometric authentication. In one example, the vehicle may open doors, illuminate lights, and provide other welcome functionality.

In another embodiment from the perspective of the mobile computing device 104, the mobile computing device 104 may receive a first communication from a first hardware device associated with a vehicle. The first hardware device may be the wireless hardware device 216. The mobile computing device 104 may transmit a second communication in response to the first communication. The second communication may be sent by the wireless hardware device 316. After sending the second communication, the mobile computing device 104 may receive a notification from the vehicle 102, the notification comprising a request for authentication based on a comparison between an approach vector based on the first communication and the second communication and a known approach vector. Information associated with the notification may be displayed on the touch screen 308. As an example, the notification may indicate that a fingerprint authorization is requested. In addition, the mobile computing device 104 may provide audible or haptic feedback upon receipt of the notification. The mobile computing device 104 may receive a fingerprint using a fingerprint sensor or another type of authentication and transmit a response to the request for authentication and receive access to the vehicle 102 based on the approach vector and the response to the request for authentication.

Figure 5:
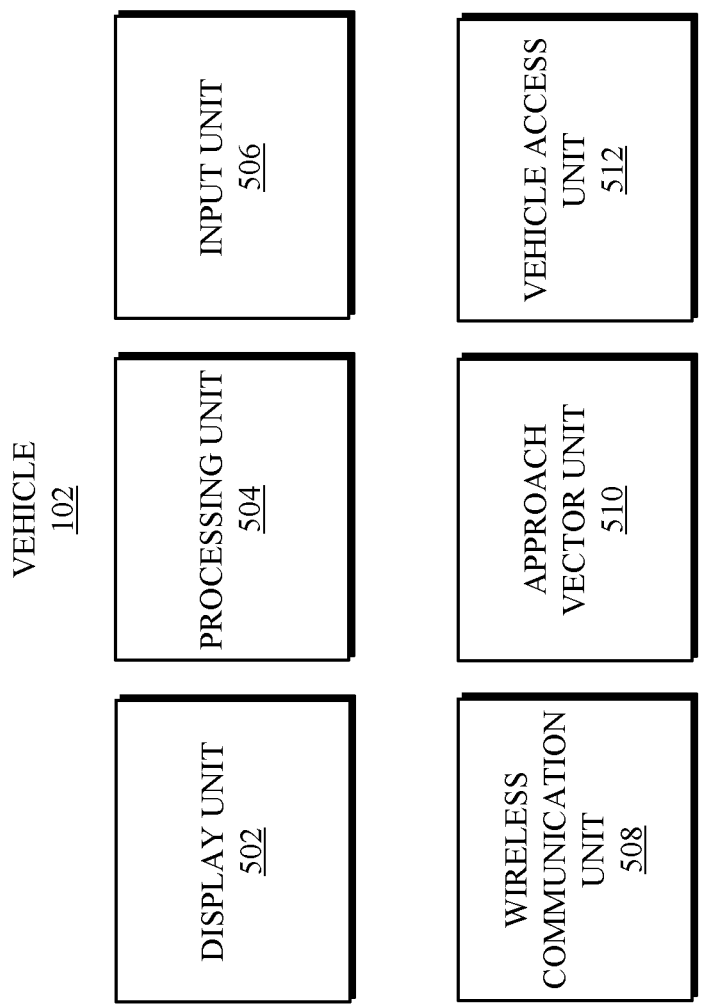
FIG. 5 illustrates a functional block diagram of an electronic device associated with the vehicle including operational units arranged to perform various operations of the presently disclosed technology.

Turning to FIG. 5, the vehicle 102 including operational units 502-512 arranged to perform various operations of the presently disclosed technology is shown. The operational units 502-512 may be provided by the vehicle authorization application 206 and may communicate with the computing device authorization application 306. The operational units 502-512 of the vehicle 102 are implemented by hardware or a combination of hardware and software to carry out the principles of the present disclosure. It will be understood by persons of skill in the art that the operational units 502-512 described in FIG. 5 may be combined or separated into sub-blocks to implement the principles of the present disclosure. Therefore, the description herein supports any possible combination or separation or further definition of the operational units 502-512.

In one implementation, the vehicle 102 includes a display unit 502 configured to display information, such as a graphical user interface, and a processing unit 504 in communication with the display unit 502 and an input unit 506 configured to receive data from input devices or systems. Various operations described herein may be implemented by the processing unit 504 using data received by the input unit 506 to output information for display using the display unit 502.

Additionally, in one implementation, the vehicle 102 includes units implementing the operations described with respect to FIG. 4. For example, the operations 402 and 404 may be implemented by a wireless communication unit 508, and the operations 406, 408, and 410 may be implemented by an approach vector unit 510. For example, the approach vector unit 510 may include a determination unit for implementing the operation 406, a comparison unit for implementing the operation 408, and a biometric authentication unit for implementing the operation 410. The biometric authentication unit may use a biometric matching engine for receiving biometric information from the sensors 210, the imaging devices 212, the sensors 310, and/or the imaging devices 312, and comparing the biometric information with the information stored in the vehicle memory 204, memory in the processor 202, the information stored in memory 304, and/or the memory in the processor 302. The biometric authentication unit determines whether the biometric information matches known biometric information (e.g., comparing the representation of a fingerprint to known fingerprints) and provides a determination of match or no match. Each known fingerprint may be first stored when an occupant approaches and/or enters the vehicle 102 or at another time. The biometric authentication unit may make the determination based on a particular location of the vehicle. Additionally, the operation 412 may be implemented by a vehicle access unit 512 that grants access to the vehicle.

The approach vector unit 510 may include a payment vector unit for comparing a payment vector and transmitting a request for biometric authentication to the mobile computing device 104. The payment vector unit also may determine the location of the vehicle 102, determine that the location of the vehicle is within a particular location zone, determine that a wireless communication from the mobile computing device 104 is sent from a location within the vehicle 102, transmit a request for biometric authentication for payment to the mobile computing device 104, and receive a response to the request for biometric authentication for payment from the mobile computing device 104. In an additional example, the payment vector unit may receive a wireless communication from another computing device associated with the particular location zone and/or physically located within the particular location zone. The other computing device may be provided by a merchant.

Figure 6:
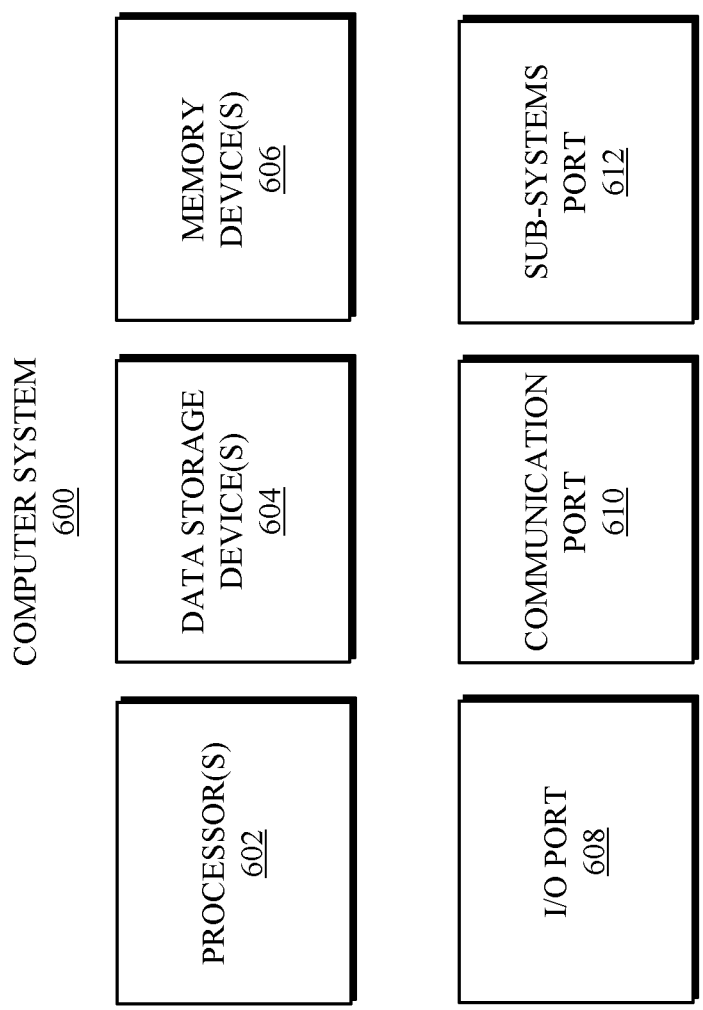
FIG. 6 is an example computing system that may implement various systems and methods of the presently disclosed technology.

Referring to FIG. 6, a detailed description of an example computing system 600 having computing units that may implement various systems and methods discussed herein is provided. The computing system 600 may be applicable to the vehicle 102 and the mobile computing device 104 and other computing or network devices. It will be appreciated that specific implementations of these devices may be of differing possible specific computing architectures not all of which are specifically discussed herein but will be understood by those of ordinary skill in the art.

The computer system 600 may be a computing system that is capable of executing a computer program product to execute a computer process. Data and program files may be input to the computer system 600, which reads the files and executes the programs therein. Some of the elements of the computer system 600 are shown in FIG. 6, including hardware processors 602, data storage devices 604, memory devices 608, and/or ports 608-612. Additionally, other elements that will be recognized by those skilled in the art may be included in the computing system 600 but are not explicitly depicted in FIG. 6 or discussed further herein. Various elements of the computer system 600 may communicate with one another by way of communication buses, point-to-point communication paths, or other communication means not explicitly depicted in FIG. 6.

The processor 602 may include, for example, a central processing unit (CPU), a microprocessor, a microcontroller, a digital signal processor (DSP), and/or internal levels of cache. There may be processors 602, such that the processor 602 comprises a single central-processing unit, or multiple processing units capable of executing instructions and performing operations in parallel with each other, commonly referred to as a parallel processing environment.

The computer system 600 may be a conventional computer, a distributed computer, or any other type of computer, such as external computers made available via a cloud computing architecture. The presently described technology is optionally implemented in software stored on the data stored device(s) 604, stored on the memory device(s) 606, and/or communicated via the ports 608-612, thereby transforming the computer system 600 in FIG. 6 to a special purpose machine for implementing the operations described herein. Examples of the computer system 600 include personal computers, terminals, workstations, mobile phones, tablets, laptops, personal computers, multimedia consoles, gaming consoles, set top boxes, and the like.

The data storage devices 604 may include any non-volatile data storage device capable of storing data generated or employed within the computing system 600, such as computer executable instructions for performing a computer process, which may include instructions of both application programs and an operating system (OS) that manages the various components of the computing system 600. The data storage devices 604 may include, without limitation, magnetic disk drives, optical disk drives, solid state drives (SSDs), flash drives, and the like. The data storage devices 604 may include removable data storage media, non-removable data storage media, and/or external storage devices made available via a wired or wireless network architecture with such computer program products, including database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 604 and/or the memory devices 606, which may be referred to as machine-readable media. It will be appreciated that machine-readable media may include any tangible non-transitory medium that is capable of storing or encoding instructions to perform any of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the executable instructions or data structures.

In some implementations, the computer system 600 includes ports, such as an input/output (I/O) port 608, a communication port 610, and a sub-systems port 612, for communicating with other computing, network, or vehicle devices. It will be appreciated that the ports 608-612 may be combined or separate and that more or fewer ports may be included in the computer system 600.

The I/O port 608 may be connected to an I/O device, or other device, by which information is input to or output from the computing system 600. Such I/O devices may include, without limitation, input devices, output devices, and/or environment transducer devices.

In one implementation, the input devices convert a human-generated signal, such as, human voice, physical movement, physical touch or pressure, and/or the like, into electrical signals as input data into the computing system 600 via the I/O port 608. Similarly, the output devices may convert electrical signals received from computing system 600 via the I/O port 608 into signals that may be sensed as output by a human, such as sound, light, and/or touch. The input device may be an alphanumeric input device, including alphanumeric and other keys for communicating information and/or command selections to the processor 602 via the I/O port 608. The input device may be another type of user input device including, but not limited to: direction and selection control devices, such as a mouse, a trackball, cursor direction keys, a joystick, and/or a wheel; sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 600 via the I/O port 608. For example, an electrical signal generated within the computing system 600 may be converted to another type of signal, and/or vice-versa. In one implementation, the environment transducer devices sense characteristics or aspects of an environment local to or remote from the computing device 600, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 600, such as, physical movement of some object (e.g., a mechanical actuator), heating or cooling of a substance, adding a chemical substance, and/or the like.

In one implementation, a communication port 610 is connected to a network by way of which the computer system 600 may receive network data useful in executing the methods and systems set out herein as well as transmitting information and network configuration changes determined thereby. Stated differently, the communication port 610 connects the computer system 600 to communication interface devices configured to transmit and/or receive information between the computing system 600 and other devices by way of wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. Such communication interface devices may be utilized via the communication port 610 to communicate with other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 610 may communicate with an antenna for electromagnetic signal transmission and/or reception. In some examples, an antenna may be employed to receive Global Positioning System (GPS) data to facilitate determination of a location of a machine, vehicle, or another device.

The computer system 600 may include a sub-systems port 612 for communicating with systems related to a vehicle to control an operation of the vehicle 102 and/or exchange information between the computer system 600 and sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, vehicle authorization information and software and other modules and services may be embodied by instructions stored on the data storage devices 604 and/or the memory devices 606 and executed by the processor 602. The computer system 600 may be integrated with or otherwise form part of a vehicle. In some instances, the computer system 600 is a portable device that may be in communication and working in conjunction with various systems or sub-systems of a vehicle.

The system set forth in FIG. 6 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

For the purpose of promoting an understanding of the principles of the present disclosure, reference was made to the embodiments illustrated in the drawings, and specific language was used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
a processor to:
transmit a first communication to a first device;
receive a second communication from the first device in response to the first communication;
determine an approach vector of the first device moving towards an asset based on the first communication and the second communication; and
when the approach vector is not a match with at least one known approach vector:
transmit a request for a secondary authentication to the first device;
receive a response to the request for the secondary authentication from the first device; and
grant access to the asset based on the response to the request for the secondary authentication.

2. The system of claim 1, wherein the first device is an ultra-wideband (UWB) hardware device and the second device is a UWB hardware device.

3. The system of claim 2, the processor further to perform triangulation based on the first communication sent from the UWB hardware device and the second communication sent from the UWB hardware device and determine the approach vector.

4. The system of claim 1, wherein the asset is a vehicle, the processor further to determine that the second communication is sent from a location within the vehicle and control a third communication from a location outside of the vehicle.

5. The system of claim 1, wherein the asset is a vehicle, the processor further to determine a location of the vehicle and grant access to the vehicle based on the location of the vehicle in addition to the approach vector.

6. The system of claim 1, the processor further to transmit a request for biometric authentication for payment to the first device and receive a response to the request for biometric authentication for payment from the first device.

7. The system of claim 1, the processor further to determine a location of the vehicle, determine that the location of the vehicle is within a particular zone, receive a third communication from a third device physically located within the particular zone, determine that the second communication is sent from a location within the vehicle, transmit a request for biometric authentication for payment to the mobile computing device, and receive a response to the request for biometric authentication for payment from the mobile computing device.

8. The system of claim 1, wherein the asset is a vehicle, the processor further to determine that the second communication is sent from a location within the vehicle and to perform one or more of set seat preferences, operate media functions, and provide climate control to a seat associated with the location within the vehicle.

9. The system of claim 1, wherein the asset is a vehicle, the processor to instruct the vehicle to autonomously travel to a location associated with the second communication.

10. The system of claim 9, the processor further to at least one of unlock a door when the vehicle is within a particular distance of the location associated with the second communication or illuminate a light when the vehicle is within a particular distance of the location associated with the second communication.

11. The system of claim 1, wherein the asset is a vehicle, the processor further to unlock a door based on the approach vector.

12. The system of claim 1, wherein the first device is a mobile computing device and the asset is a vehicle.

13. The system of claim 12, the processor further to determine a location of the vehicle, determine that the location of the vehicle is within a particular zone, determine that the second communication is sent from a location within the vehicle, transmit a request for biometric authentication for payment to the mobile computing device, and receive a response to the request for biometric authentication for payment from the mobile computing device.

14. A system comprising:
a processor to:
receive a first communication from a first device associated with an asset at a second device;
transmit a second communication from the second device to the first device in response to the first communication;
receive a request for a secondary authentication from the first device based on an approach vector of the second device moving towards the asset determined based on the first communication and the second communication, the request for the secondary authentication being received in response to when the approach vector is not a match with the at least one known approach vector;
transmit a response to the request for the secondary authentication to the first device; and
grant access to the asset based on the response to the request for the secondary authentication.

15. The system of claim 14, wherein the processor further to:
capture biometric attributes using a sensor in response to the request for secondary authentication;
compare the captured biometric attributes with stored biometric attributes;
authenticate the captured biometric attributes, the response to the request for secondary authentication being based on authentication of the captured biometric attributes.

16. The system of claim 15, wherein the first device is an ultra-wideband (UWB) hardware device and the second device is a UWB hardware device.

17. The system of claim 15, the processor further to receive a request for biometric authentication for payment and transmit a response to the request for biometric authentication for payment based on the captured biometric attributes.

18. The system of claim 15, the processor further to determine a location, determine that the location is within a particular zone, receive a request for biometric authentication for payment, and transmit a response to the request for biometric authentication for payment based on the captured biometric attributes.

19. The system of claim 14, wherein the asset is a vehicle, and the vehicle autonomously travels to a location associated with the second communication.

20. The system of claim 19, the processor further to at least one of unlock a door when the vehicle is within a particular distance of the location associated with the second communication or illuminate a light when the vehicle is within a particular distance of the location associated with the second communication.

21. The system of claim 14, wherein the second device is a mobile computing device, the asset is a vehicle, and the second computing device is deployed in the vehicle.

* * * * *